United States Patent [19]

Engwall

[11] Patent Number: 5,121,907

[45] Date of Patent: Jun. 16, 1992

[54] ROTATABLE RECONFIGURABLE TABLE FOR HOLDING AND SUPPORTING CONTOURED WORKPIECES

[75] Inventor: Dwight L. Engwall, Wichita, Kans.

[73] Assignee: The Boeing Company, Seattle, Wash.

[21] Appl. No.: 718,634

[22] Filed: Jun. 21, 1991

[51] Int. Cl.⁵ .............................................. B25B 1/22
[52] U.S. Cl. ........................................ 269/21; 269/71; 269/131; 269/46
[58] Field of Search ............... 269/266, 71, 130–132, 269/296, 46, 21; 254/134

[56] References Cited

U.S. PATENT DOCUMENTS

| | | |
|---|---|---|
| 1,600,835 | 9/1926 | Manley ................................ 269/71 |
| 2,578,220 | 12/1951 | Billner . |
| 2,890,077 | 6/1959 | Littell . |
| 2,986,075 | 5/1961 | Ranney . |
| 3,276,611 | 10/1966 | Horton . |
| 3,530,994 | 9/1970 | Bourassa et al. . |
| 3,690,641 | 9/1972 | Claycomb . |
| 3,858,867 | 1/1975 | Claycomb . |
| 3,858,926 | 1/1975 | Ottenhues . |
| 3,976,205 | 8/1976 | Goransson . |
| 4,067,562 | 1/1978 | Weber ................................ 269/71 |
| 4,088,312 | 5/1978 | Frosch et al. . |
| 4,200,272 | 4/1980 | Godding . |
| 4,307,877 | 12/1981 | Rogos ................................. 269/71 |
| 4,570,905 | 2/1986 | Gestner ............................ 254/134 |
| 4,684,113 | 8/1987 | Douglas et al. . |
| 4,819,922 | 4/1989 | Boike ................................. 269/71 |
| 4,936,560 | 6/1990 | Barozzi ............................ 269/266 |

*Primary Examiner*—Robert C. Watson
*Attorney, Agent, or Firm*—Finnegan, Henderson, Farabow, Garrett & Dunner

[57] ABSTRACT

A reconfiguration table, for holding and supporting a contoured workpiece while work is performed thereon comprising a frame defining a perimeter and a plane; a plurality of support elements disposed in spaced array within the frame perimeter, each element having an end and being independently translatable in a direction substantially perpendicular to the plane, the ends of the elements cooperating to define a support surface for the workpiece; clamp members, supported by the frame, for selectively locking the elements in position to define the support surface; attaching members, supported by the frame independently of the support elements, for holding the workpiece on the support surface; and a gear reducer and motor for rotating the frame with the workpiece supported thereon about an axis parallel to the plane of the frame.

17 Claims, 4 Drawing Sheets

ROTATABLE RECONFIGURABLE TABLE FOR HOLDING AND SUPPORTING CONTOURED WORKPIECES

BACKGROUND OF THE INVENTION

1. Field of the Invention

The present invention relates to fixtures for holding and supporting contoured workpieces while work is performed thereon.

2. Description of the Related Art

The following U.S. Pat. Nos. are noted as bearing in a general way on the subject matter of the present invention: 4,200,272; 3,530,994; 4,684,113; and 2,890,077.

U.S. Pat. No. 4,200,272 discloses individual support elements biased by spring or pressurized fluid that will depress under the weight of a workpiece, and a means for individually clamping the support elements in a fixed position. U.S. Pat. No. 3,530,994 discloses individual support elements that will depress under the weight of a workpiece when the weight overcomes a frictional force exerted on the support elements. U.S. Pat. No. 4,684,113 discloses individual support elements and vacuum holding through the individual support elements. U.S. Pat. No. 2,890,077 discloses vacuum holding to invert a workpiece.

This related art has several disadvantages. In particular, the disclosed apparatus involve large costs in designing, modifying, and assembling customized tables for each particular workpiece. Additionally, for the complex fixtures disclosed that will accommodate a variety of contoured workpieces, those fixtures carry high costs and result in manufacturing delays caused by time consuming adjustments needed before work can begin on each workpiece.

SUMMARY OF THE INVENTION

The objects of the invention are to provide a low cost table of simple structural design that can hold and support a variety of contoured workpiece and that allows easy work access to all areas of the workpiece on which work must be performed. Contoured aircraft skin panels are an example of the type of workpiece contemplated for use with the present invention. Such panels vary greatly in size and contour and are difficult to support during machining and polishing operations.

To achieve the objects and in accordance with the purpose of the invention, as embodied and broadly described herein, the invention comprises a frame, a plurality of support elements disposed in spaced array within the frame perimeter, each having an end and being independently translatable, the ends of the elements cooperating to define a support surface for a workpiece, a means for locking the position of the support elements, a means for holding a workpiece on the support surface, and a means for rotating the frame.

Another and more specific object of the invention is to provide a table that can hold and support a large workpiece and allow access to all surfaces on which work is to be performed. With large workpieces, such as aircraft skin sections, it is difficult to reach the center of the skin to polish. Because of the size and contour, variations in polishing pad pressure can occur and cause erratic polishing results when access is difficult. To alleviate this problem and to achieve this object of providing access to the entire work surfaces, the invention comprises a means for rotating a frame upon which the work piece is mounted.

A further and more specific object of the invention is to provide support for a workpiece to allow machining and polishing operations to be performed on the workpiece wherein the means for support can be engaged quickly without complex and expensive apparatus. This object is achieved by this invention comprising a plurality of support elements that quickly contact and self-adjust to contoured workpiece surfaces by the use of gravity or tensioned shock cords.

Still a further object of the invention is to provide a reconfiguration table that allows large or bulky workpieces to be easily attached to the table.

It is to be understood that both the foregoing general description and the following detailed description are exemplary and explanatory only and are not restrictive of the invention, as claimed. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate several embodiments of the invention and together with the description serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the invention, the present invention for a reconfiguration table for holding and supporting a contoured workpiece while work is performed thereon comprises a frame defining a perimeter and a plane. As embodied herein and depicted in FIGS. 1 and 2, frame 10 defines a perimeter and a plane.

Figure 4:
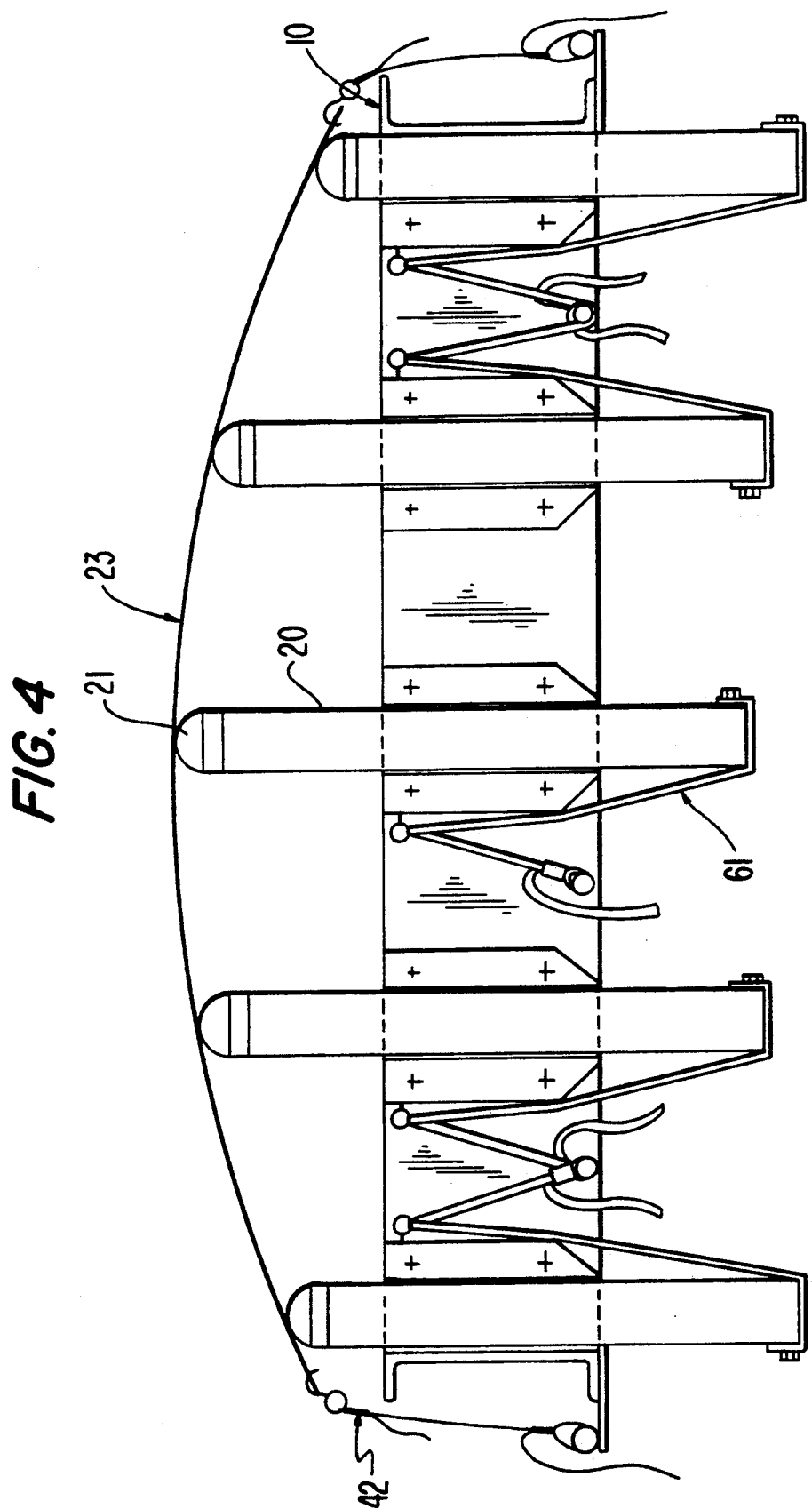
FIG. 4 is a cross-sectional view of the embodiment of the invention taken along the line A—A in FIGS. 2 and 3.

In accordance with the invention, the reconfiguration table further comprises a plurality of support elements disposed in spaced array within the frame perimeter, each element having an end and being independently translatable in a direction substantially perpendicular to the plane, the ends cooperating to define a support surface for the workpiece. As embodied herein and depicted in FIGS. 1 and 2, support elements 20 are disposed in spaced array within the perimeter of frame 10, each having an end 21 and each being independently translatable in a direction substantially perpendicular to the plane of frame 10. Ends 21 of support elements 20 cooperate to define a support surface for a contoured workpiece 23 as depicted in FIG. 4. Ends 21 may be made of a hard durometer urethane or rubber. Additionally, ends 21 may be structured with a pivoting head which allows approximately ±30° rotation for better contact with workpieces. Ends 21 may also be roughly square with an end size of approximately 8 inches by 8 inches.

In accordance with the invention, the reconfiguration table further comprises means supported by the frame for selectively locking the support elements in a position to define the support surface.

Figure 3:
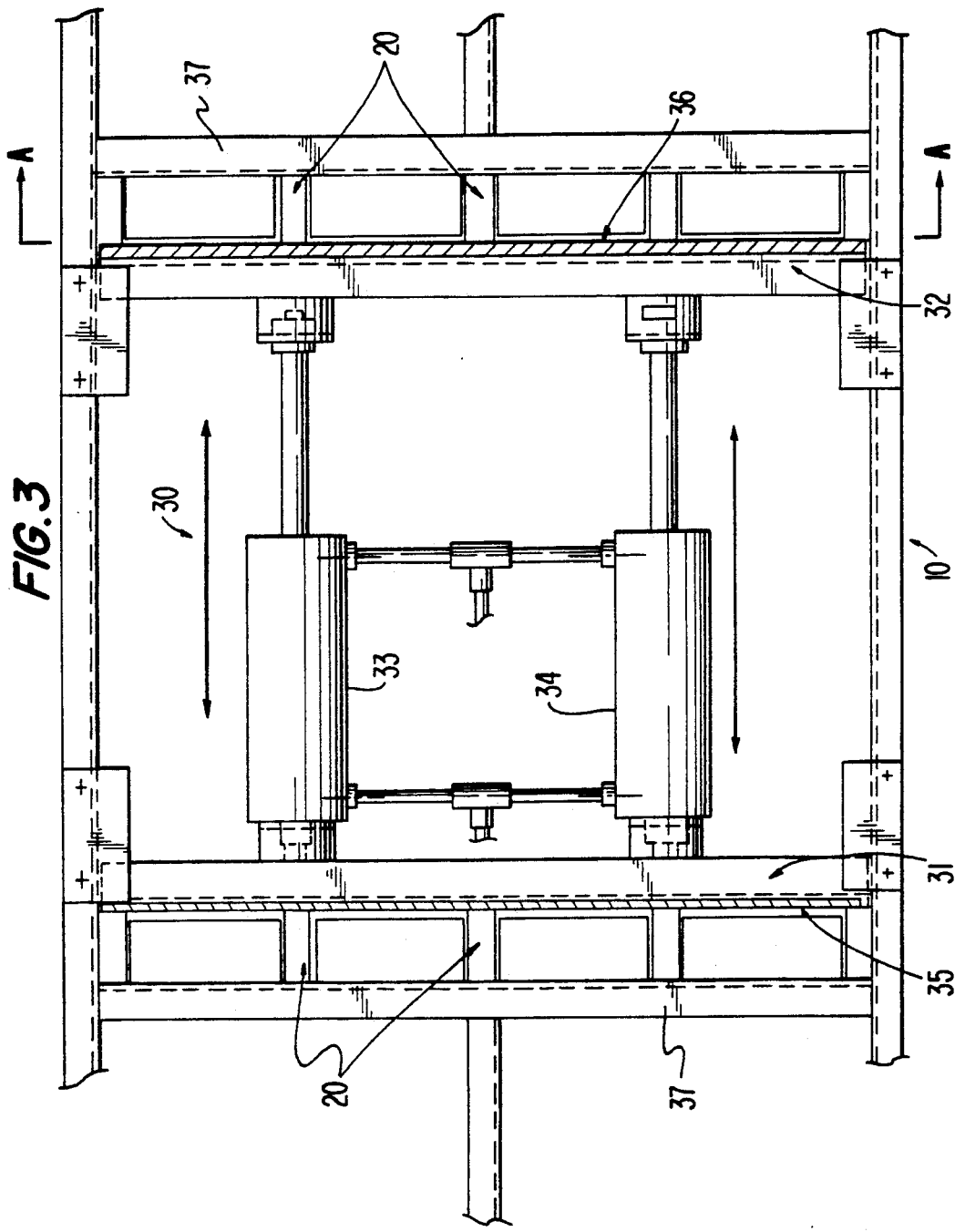
FIG. 3 is a enlarged plan view of a portion of the embodiment of FIG. 2 illustrating a means for locking the support elements.

In the preferred embodiment the locking means includes float vise 30 (FIG. 3) comprising locking members 31 and 32 and pneumatic or hydraulic cylinders 33 and 34. Locking members 31 and 32 extend transverse frame 10 and are supported by frame 10 for selective limited movement parallel to the plane thereof. Each locking member is disposed to selectively engage a plurality of support elements 20 in opposition to transverse frame elements 37 when cylinders 33, 34 are activated. Locking members 31 and 32 may have rubber faces 35 and 36, respectively, on the faces which contact the support elements 20. Rubber faces 35 and 36 provide better friction to lock the support elements in a fixed position. Float vise 30 can also selectively lock the support elements at any time regardless of whether the support elements are in a position defining a support surface.

Figure 2:
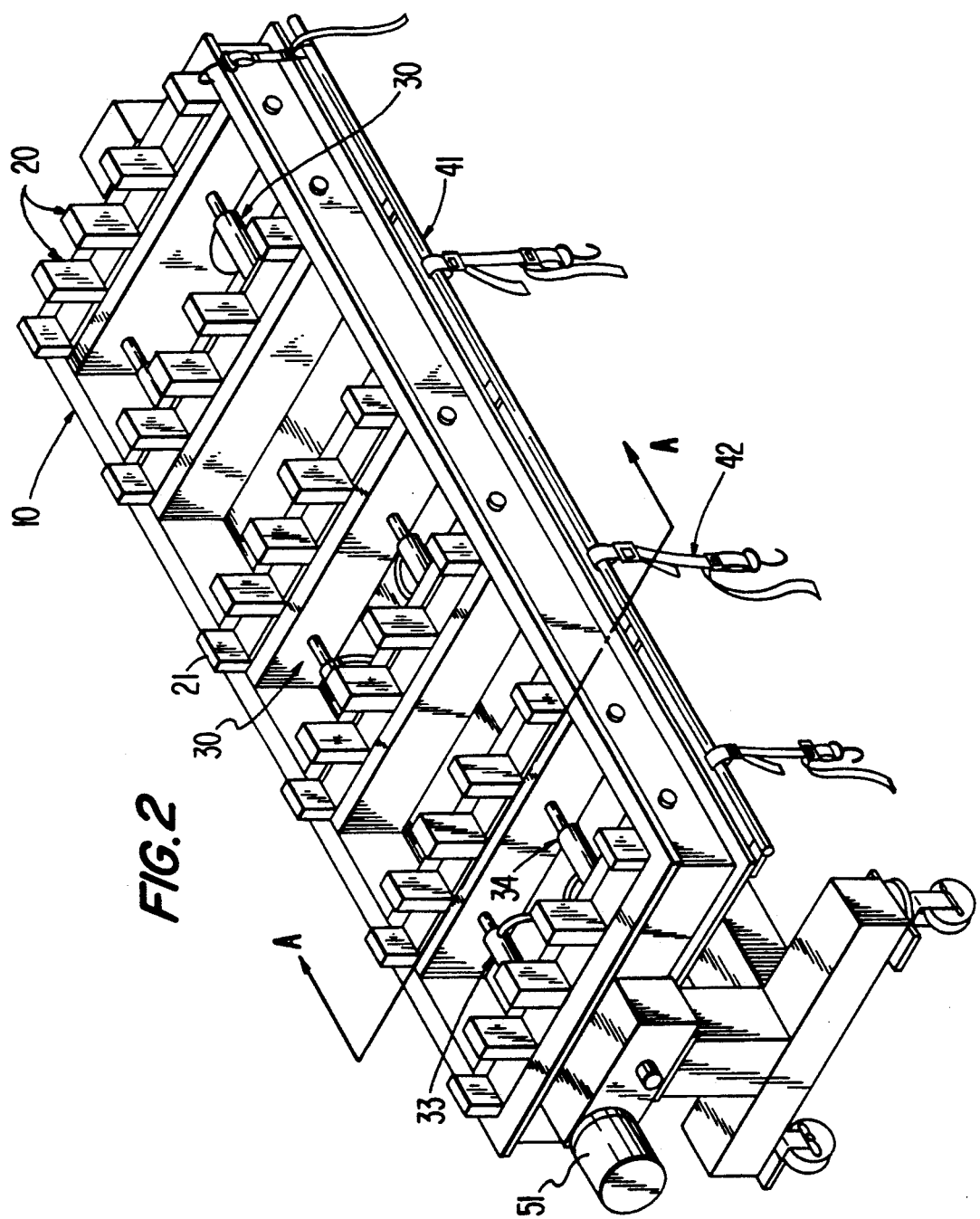
FIG. 2 is a perspective view of another embodiment of the invention.

Preferably, one float vise 30 is disposed between each pair of adjacent arrays of support elements 20 as depicted in FIG. 2. Each cylinder 33, 34 includes a piston fixed to a respective one locking member 31, 32 and a cylinder fixed to the other opposed locking member. Where an odd number of support element arrays are disposed in the frame, a float vise 30 may be located between a single locking member and a frame element.

Figure 1:
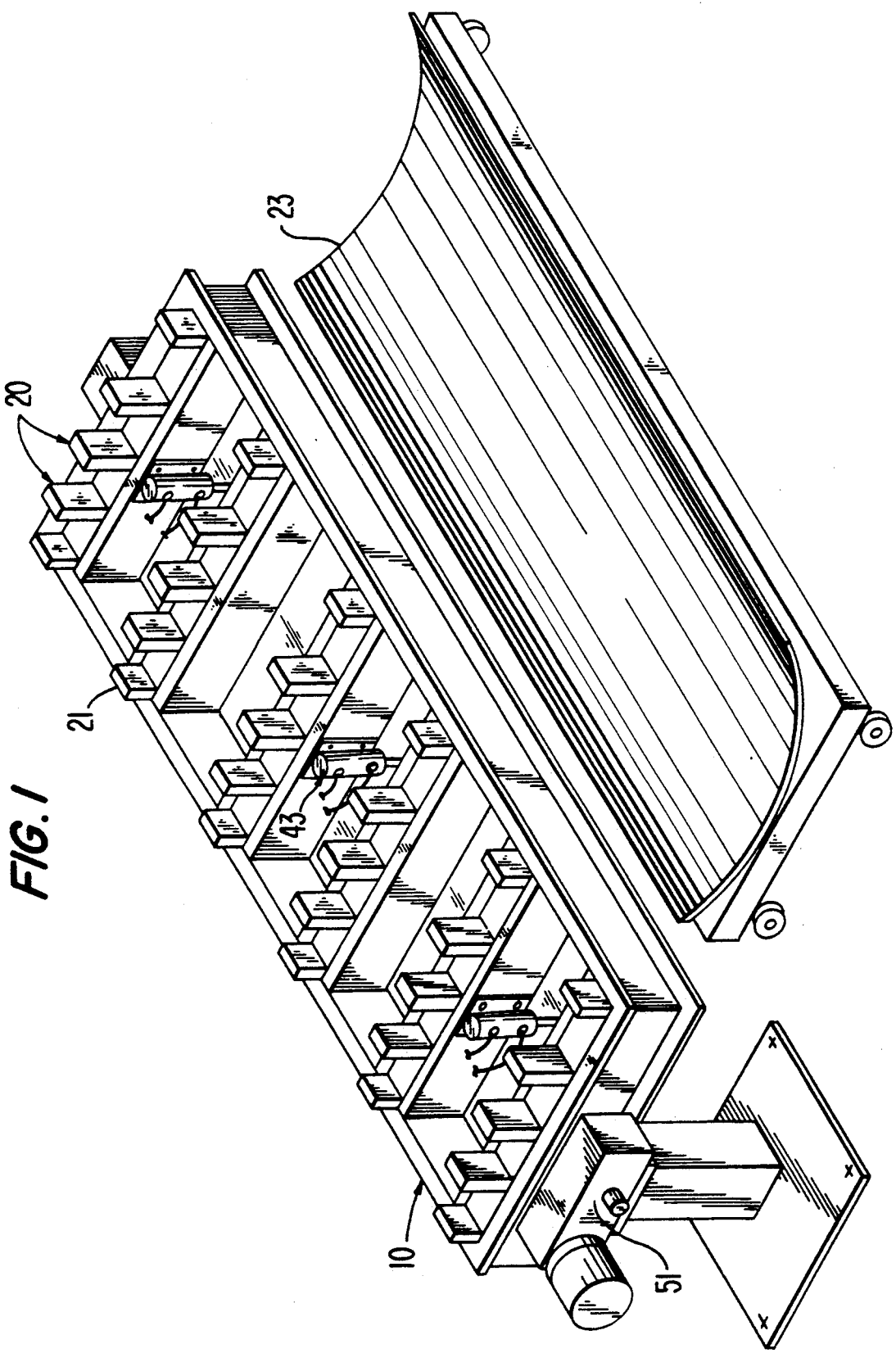
FIG. 1 is a perspective view of one embodiment of the invention schematically shown with a workpiece having a contoured surface.

Although float vise 30 is only depicted in the embodiment of FIG. 2, such a means for locking the support elements would be used in the embodiment of FIG. 1.

In accordance with the invention, the reconfiguration table further comprises means supported by the frame independently of the support elements for holding the workpiece on the support surface. As disclosed in FIG. 2, a preferred embodiment of the holding means comprises a rail 41 that is attached to or defines the perimeter of frame 10 and straps 42 that can be hooked onto a workpiece to hold the workpiece to the frame. Straps 42 are adjustable so as to be able to hold workpieces of various sizes on the support surface. In another embodiment, as shown in FIG. 1, the holding means comprises vacuum cups 43 supported by the frame 10 for selective movement into airtight engagement with workpiece 23 and a low pressure source (not shown) in fluid communication with vacuum cups 43.

In accordance with the invention, the reconfiguration table further comprises a means for rotating the frame with a workpiece supported thereon about an axis parallel to the plane of the frame. As disclosed in FIG. 1, a preferred embodiment of the rotating means comprises a gear reducer, motor, and disc brake assembly 51 supporting frame 10 for selective rotation about a long axis of the frame.

In the preferred embodiment of the invention depicted in FIG. 1, support elements 20 are disposed for translation by gravity. In the application of this preferred embodiment, workpiece 23 is placed below frame 10 and support elements 20 are released from a locked position, allowing gravity to translate them downward to contact the workpiece. Thereafter, locking members 31, 32 are moved to lock elements 20 in position to define a support surface. Vacuum cups 43 are moved into contact with workpiece 23 and activated to secure the workpiece to the support surface. Frame 10 then may be rotated by gear reducer, motor, and disc brake assembly 51 to a working position.

In an alternative embodiment of the invention, as shown in FIG. 4, the reconfiguration table further comprises detachable tensioned shock cords 61 that bias each support element 20 in a common direction substantially perpendicular to the plane of frame 10. The shock cords are detachable so that the table quickly can be modified with shock cords having the appropriate reactive force for a particular workpiece. As depicted in FIG. 4, to allow the shock cords to be quickly detachable, the shocks may be attached to frame 10 by tying the cords to a hook. Alternatively, frame 10 may have anchor slots in its walls to attach shock cords to the frame. Each slot is circular with a rectangular shaped slot portion running perpendicular to the circular portion. The thickness of the rectangular portion is roughly the thickness of the shock cords to be used. A shock cord with a knot on the end can be slipped through the circular portion and then secured in the rectangular portion of the slot.

In the application of this preferred embodiment, a workpiece is placed on top of or below support elements 20. In the latter, workpiece 23 is first placed below inverted frame 10 with the other surface in aligned relation with the support elements 20 and support elements 20 are released from a locked position allowing the elements to translate downward to contact and self-adjust to the contoured surface of the workpiece. Elements 20 are then locked in position to define a support surface to define a support surface conforming to the contour of the other surface. Workpiece 23 is attached to frame 10 by straps 42. Frame 10 is then rotated to a working position. This embodiment avoids having to lift the workpiece on top of the table which may require significant effort or mechanical means if the workpiece is large or bulky. On the other hand, workpiece 23 may be placed on top of support elements 20, which have been released from a locked position, permitting the weight of workpiece 23 in contact with the support elements to translate against the bias of cords 61 and self-adjust to the contoured surface. Thereafter, elements 20 are locked in position to define a support surface and the workpiece is secured to frame 10 by means of straps 42.

Other embodiments of the invention will be apparent to those skilled in the art from the consideration of the specification and practice of the invention disclosed herein. It is intended that the specification be considered exemplary only, with the true scope and spirit of the invention being indicated by the following claims.

What is claimed is:

1. A reconfiguration table for holding and supporting a contoured workpiece while work is performed thereon, the table comprising:
   a frame defining a perimeter and a plane;
   a plurality of support elements disposed in spaced array within the frame perimeter, each element having an end and being independently translatable in a direction substantially perpendicular to the plane, the ends of the elements cooperating to define a support surface for the workpiece, wherein translation of each support element relative to the plane of the frame is effected solely by gravity;

means, supported by the frame, for selectively locking the elements in position to define the support surface;

means, supported by the frame independently of the support elements, for holding the workpiece on the support surface; and means for rotating the frame with the workpiece supported thereon about an axis parallel to the plane of the frame.

2. A reconfiguration table for holding and supporting a contoured workpiece while work is performed thereon, the table comprising:

a frame defining a perimeter and a plane;

a plurality of support elements disposed in spaced array within the frame perimeter, each element having an end and being independently translatable in a direction substantially perpendicular to the plane, the ends of the elements cooperating to define a support surface for the workpiece;

means, supported by the frame, for selectively locking the elements in position to define the support surface;

means, supported by the frame independently of the support elements, for holding the workpiece on the support surface;

means for rotating the frame with the workpiece supported thereon about an axis parallel to the plane of the frame; and detachable members for biasing each support element in a common direction relative to the plane of the frame.

3. The reconfiguration table of claim 2 wherein the detachable members for biasing are tensioned shock cords.

4. The reconfiguration table of claim 1 wherein the locking means comprises a plurality of locking members for selectively engaging and disengaging respective support elements.

5. The reconfiguration table of claim 4 further comprising a pneumatic cylinder connecting locking members.

6. The reconfiguration table of claim 1 wherein the holding means comprises a vacuum cup supported by the frame for selective movement into airtight engagement with a workpiece disposed in contact with the support surface and a low pressure source in fluid communication with the vacuum cup.

7. The reconfiguration table of claim 1 wherein the holding means comprises a vacuum cup supported by the frame for selective movement into airtight engagement with a workpiece disposed in contact with the support surface and a low pressure source in fluid communication with the vacuum cup.

8. The reconfiguration table of claim 1 wherein the holding means comprises means for releasably attaching the workpiece to the frame at predetermined positions on the periphery of the workpiece.

9. The reconfiguration table of claim 2 wherein the holding means comprises means for releasably attaching the workpiece to the frame at predetermined positions on the periphery of the workpiece.

10. A method for holding and supporting a contoured workpiece having a surface on which work is to be performed and an opposed non-work surface, the method comprising the steps of:

disposing the non-work surface of the workpiece in aligned relation with a spaced array of individual support elements releasably fixed within a frame, wherein the workpiece is below the frame, each element having an end and being disposed for independent translation in a direction perpendicular to a plane defined by the frame, the ends of the elements cooperating to define a support surface when released;

releasing the support elements for translation by gravity to contact positions wherein the ends thereof contact the other surface of the workpiece and self-adjust to define a support surface conforming to the contour of the non-work surface;

attaching the workpiece to the frame while in contact with the support surface;

locking the support elements in position to define the support surface; and rotating the frame with the workpiece attached thereto to a desired position for working on a surface thereof.

11. The method of claim 10 wherein the attaching step is carried out by placing a vacuum cup moveably supported by the frame into contact with the non-work surface of the workpiece and conducting low pressure to the vacuum cup to attach the workpiece to the frame.

12. A method for holding and supporting a contoured workpiece having a surface on which work is to be performed and an opposed non-work surface, the method comprising the steps of:

disposing the non-work surface of the workpiece in aligned relation with a spaced array of individual support elements releasably fixed within a frame, each element having an end and being disposed for independent translation in a direction perpendicular to a plane defined by the frame, the ends of the elements cooperating to define a support surface when released and the support elements being biased in a common direction, wherein the disposing step is carried out by placing the non-work surface of the workpiece into contact with the ends;

releasing the support elements for translation to contact positions wherein the ends thereof contact the non-work surface of the workpiece and self-adjust to define a support surface conforming to the contour of the non-work surface, and wherein the releasing step permits the weight of the workpiece to translate the elements against the bias to define the support surface;

attaching the workpiece to the frame while in contact with the support surface;

locking the support elements in position to define the support surface; and rotating the frame with the workpiece attached thereto to a desired position for working on a surface thereof.

13. The method of claim 12 wherein the attaching step comprises securing the periphery of the workpiece to the periphery of the frame.

14. The method of claim 12 wherein the support elements are biased with tensioned shock cords.

15. The reconfiguration table of claim 2 wherein the detachable members for biasing are tensioned shock cords.

16. The reconfiguration table of claim 15 further comprising a pneumatic cylinder connecting locking members.

17. The reconfiguration table of claim 2 wherein the holding means comprises a vacuum cup supported by the frame for selective movement into airtight engagement with a workpiece disposed in contact with the support surface and a low pressure source in fluid communication with the vacuum cup.

* * * * *